G. W. ATKINS.
SAW-SHARPENER AND TOOTH-GAGE.

No. 193,209. Patented July 17, 1877.

Witnesses
Saml. J. Van Stavoren
Jos. B. Connolly

Inventor
George W. Atkins
By Connolly Bros
Attorneys

N. PETERS, PHOTO-LITHOGRAPHER, WASHINGTON, D. C.

UNITED STATES PATENT OFFICE.

GEORGE W. ATKINS, OF MILTON, DELAWARE, ASSIGNOR OF ONE-HALF HIS RIGHT TO GEORGE H. HULINGS.

IMPROVEMENT IN SAW-SHARPENER AND TOOTH-GAGE.

Specification forming part of Letters Patent No. 193,209, dated July 17, 1877; application filed May 15, 1877.

*To all whom it may concern:*

Be it known that I, GEORGE W. ATKINS, of Milton, in the county of Sussex and State of Delaware, have invented a certain new and useful Saw-Sharpener and Tooth-Gage; and I do hereby declare the following to be a full, clear, and exact description of the invention, such as will enable others skilled in the art to which it pertains to make and use it, reference being had to the accompanying drawings, which form part of this specification, in which—

Figure 1:
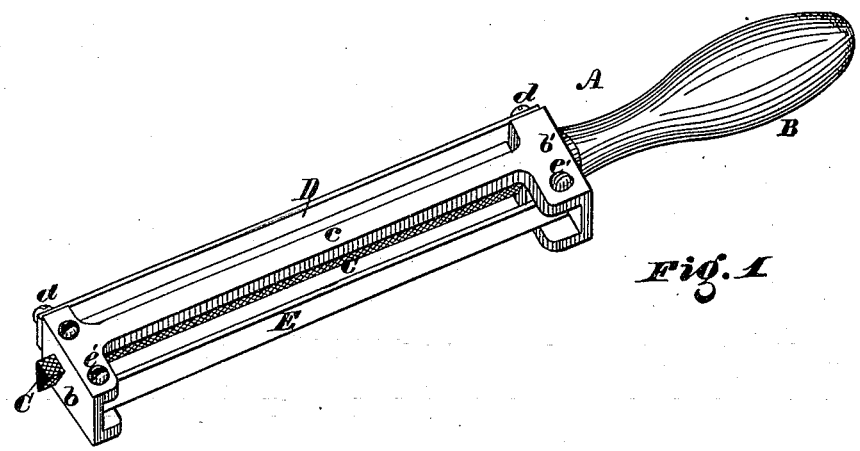
Figure 2:
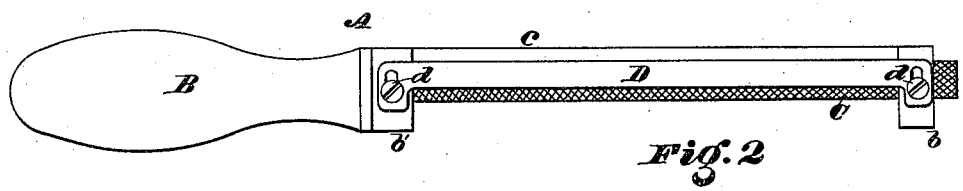
Figure 3:
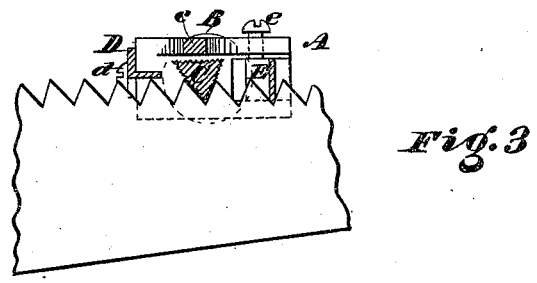

Figure 1 is a perspective view. Fig. 2 is a side view, and Fig. 3 is a transverse section.

This invention has relation to saw-sharpeners; and consists in the novel construction of an improved hand-tool, holding a suitable saw-file, and provided with two adjustable gages, one to regulate the width or distance apart of the teeth and their number to the inch of blade, the other to gage their length and preserve their uniformity through the whole stretch of the saw, all the parts being constructed and arranged in the manner hereinafter described and specifically claimed.

Referring to the drawings illustrating my invention, A designates the file and gage holder, consisting of the hand-piece B, brackets b b', and longitudinal connecting-bar c. C designates a three-sided saw-file, of uniform thickness throughout its cutting portion. The ends of this file are secured, respectively, to the brackets b b' beneath the bar c, said brackets being suitably pierced to receive and retain said file.

The arrangement of the file is such as to bring one of its angles below, and to give such a pitch to the two converging sides as is required to properly shape the teeth of the saw.

D represents a gage, consisting of a bar of angle-iron or other material, preferably case-hardened or chilled. Said bar has slotted ends, through which pass screws d d, securing the gage to the brackets, and allowing it to be adjusted.

In filing, the ends of the saw-teeth come in contact with the under portion of this gage as soon as the required length is obtained. The file can then cut no farther; hence the teeth are all cut of a uniform length, their points coinciding perfectly, and preserving the original edge-line of the blade. The adjustment of the gage D is made by loosening the screws d d and raising or lowering the former, according as the teeth are required to be long or short. In this respect a proper relation will be kept between the number of teeth to the inch and their length.

E designates a gage to regulate the width of the teeth, consisting of a bar of suitable metal, having its ends bent inwardly and set within recesses or channels cut or formed in the inner surfaces of the brackets b b'. This gage is preferably beveled, being designed to fall into the successive notches of the saw, and has its lower edge about on a line with the lower angle of the file. It is held in place by two screws, e', which pass into the recesses through the bracket, and impinge upon the edge of the gage. By loosening these screws the gage may be adjusted toward or from the file.

In filing, there will usually be several teeth included between the file and the gage E, but the latter, as the work progresses, is transferred to each and every notch in succession, so that all the teeth will be of exactly the same character.

Having described my invention, I claim—

The improved saw-sharpener and tooth-gage, consisting of the file-holder A, having the handle B and longitudinal brace C, and provided with the vertically-adjustable slotted gage D, secured by screws d d, and the laterally-adjustable gage E, having its ends inserted in sockets, and secured by screws e' e', all as shown and described.

In testimony that I claim the foregoing I have hereunto set my hand this 9th day of May, 1877.

GEORGE W. ATKINS.

Witnesses:
 THOS. A. CONNOLLY,
 CHAS. F. VAN HORN.